United States Patent
Li et al.

(10) Patent No.: US 7,508,632 B2
(45) Date of Patent: Mar. 24, 2009

(54) HEAD-DISC INTERFACE (HDI) WITH SOLID LUBRICANTS

(75) Inventors: Lei Li, Wexford, PA (US); Emil Catoc Esmenda, Wexford, PA (US); Yiao-Tee Hsia, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 374 days.

(21) Appl. No.: 11/188,521

(22) Filed: Jul. 25, 2005

(65) Prior Publication Data

US 2007/0019323 A1    Jan. 25, 2007

(51) Int. Cl.
G11B 5/60 (2006.01)
G11B 5/62 (2006.01)

(52) U.S. Cl. .................. 360/235.4; 360/135; 360/235.2

(58) Field of Classification Search ............. 360/235.1, 360/235.4, 235.8, 135, 235.2
See application file for complete search history.

(56) References Cited

U.S. PATENT DOCUMENTS

| | | | |
|---|---|---|---|
| RE32,464 E * | 7/1987 | Aine | 428/622 |
| 4,816,334 A | 3/1989 | Yokoyama et al. | |
| 5,118,577 A * | 6/1992 | Brar et al. | 360/235.2 |
| 5,143,787 A | 9/1992 | Frew et al. | |
| 5,231,613 A * | 7/1993 | Nakayama et al. | 369/13.17 |
| 5,661,618 A | 8/1997 | Brown et al. | |
| 5,808,833 A | 9/1998 | Motomatsu et al. | |
| 5,858,536 A | 1/1999 | Yanagisawa | |
| 5,888,591 A | 3/1999 | Gleason et al. | |
| 5,989,625 A | 11/1999 | Hilgers et al. | |
| 6,249,403 B1 * | 6/2001 | Tokisue et al. | 360/235.2 |
| 6,329,023 B2 | 12/2001 | Tokisue et al. | |
| 6,433,966 B1 | 8/2002 | Tang et al. | |
| 6,477,011 B1 | 11/2002 | Hsiao et al. | |
| 6,524,687 B2 | 2/2003 | Horng et al. | |
| 6,589,641 B1 * | 7/2003 | Stirniman et al. | 428/216 |
| 6,643,098 B2 | 11/2003 | Takahashi | |
| 6,773,784 B2 | 8/2004 | Sonoda et al. | |
| 2003/0096141 A1 * | 5/2003 | Chen | 428/694 ML |
| 2005/0044695 A1 * | 3/2005 | Fong et al. | 29/603.03 |

OTHER PUBLICATIONS

T. Yamamoto et al., "Advanced Stiction-Free Slider and DLC Overcoat," *FUJITSU Sci. Tech. J.*, vol. 37, No. 2, Dec. 2001, pp. 201-211.

* cited by examiner

*Primary Examiner*—Jefferson Evans
(74) *Attorney, Agent, or Firm*—Robert P. Lenart, Esq.; Pietragallo Gordon Alfano Bosick & Raspanti, LLP

(57) ABSTRACT

An apparatus comprises a storage medium having a surface coated with a layer of a first solid lubricant, and a head separated from the storage medium by an air film, the head having an air bearing surface, wherein at least a portion of the air bearing surface is coated with a layer of a second solid lubricant.

14 Claims, 3 Drawing Sheets

HEAD-DISC INTERFACE (HDI) WITH SOLID LUBRICANTS

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

This invention relates to data storage devices, and more particularly to such devices that include a head and a rotatable storage medium.

BACKGROUND OF THE INVENTION

Hard disc drives have traditionally employed electromagnetic transducers that are spaced from a rapidly spinning rigid disc by a thin layer of air that moves with the disc surface. Such a spacing is believed to be important in avoiding damage between the rapidly spinning disc and the transducer, which is constructed with an aerodynamic "slider" designed to "fly" slightly above the disc surface, buoyed by the moving air layer. This spacing or fly height, however, limits the density with which data can be stored and lowers the resolution and amplitude with which data can be retrieved.

Currently, a liquid lubricant layer is placed on top of the magnetic recording media to reduce friction and wear caused by possible head-disc contact. The lubricants being used now are perfluoropolyethers, including Fomblin® Z and Y lubricants from Ausimont S.p.A., Krytox® lubricants from E. I. du Pont de Nemours, and Demnum® lubricants from Daikin America, Inc. When liquid lubricants are used in a hard disc drive, stiction, spin-off and lubricant transfer from the disc to the recording head may occur and thus reduce the reliability of head-disc interface.

Heat Assisted Magnetic Recording (HAMR) has been proposed recently to deliver one terabit per square inch (Tbpsi) data density. In HAMR, the disc surface will be heated to 400° C. or above by laser irradiation. Existing liquid lubricants cannot survive this temperature. Therefore, it is necessary to develop a lubricant with higher thermal stability. Sputtered polytetrafluoroethylene (PTFE) has been shown to be a promising candidate for this purpose.

To achieve higher data density in magnetic recording, the head fly height has been reduced. Currently, the head fly height is below 10 nm. This small head-disc spacing increases the possibility of head-media contact. Liquid lubricants can flow back after they are removed from their original position. Solid lubricants have been proposed for use on the surface of recording media. However, once solid lubricants are removed from the original position, they are gone permanently.

Therefore, there is a need for a way to reduce the wear rate for a solid-lubricated media.

SUMMARY OF THE INVENTION

This invention provides an apparatus comprising a storage medium having a surface coated with a layer of a first solid lubricant, and a head separated from the storage medium by an air film, the head having an air bearing surface, wherein at least a portion of the air bearing surface is coated with a layer of a second solid lubricant.

In another aspect, the invention provides a data storage apparatus comprising a storage medium having a surface coated with a layer of a first solid lubricant, a motor for rotating the storage medium, a head separated from the storage medium by an air film, the head having an air bearing surface, wherein at least a portion of the air bearing surface is coated with a layer of a second solid lubricant, and a suspension arm for positioning the head adjacent to the surface of the storage medium.

DETAILED DESCRIPTION OF THE INVENTION

Figure 1:
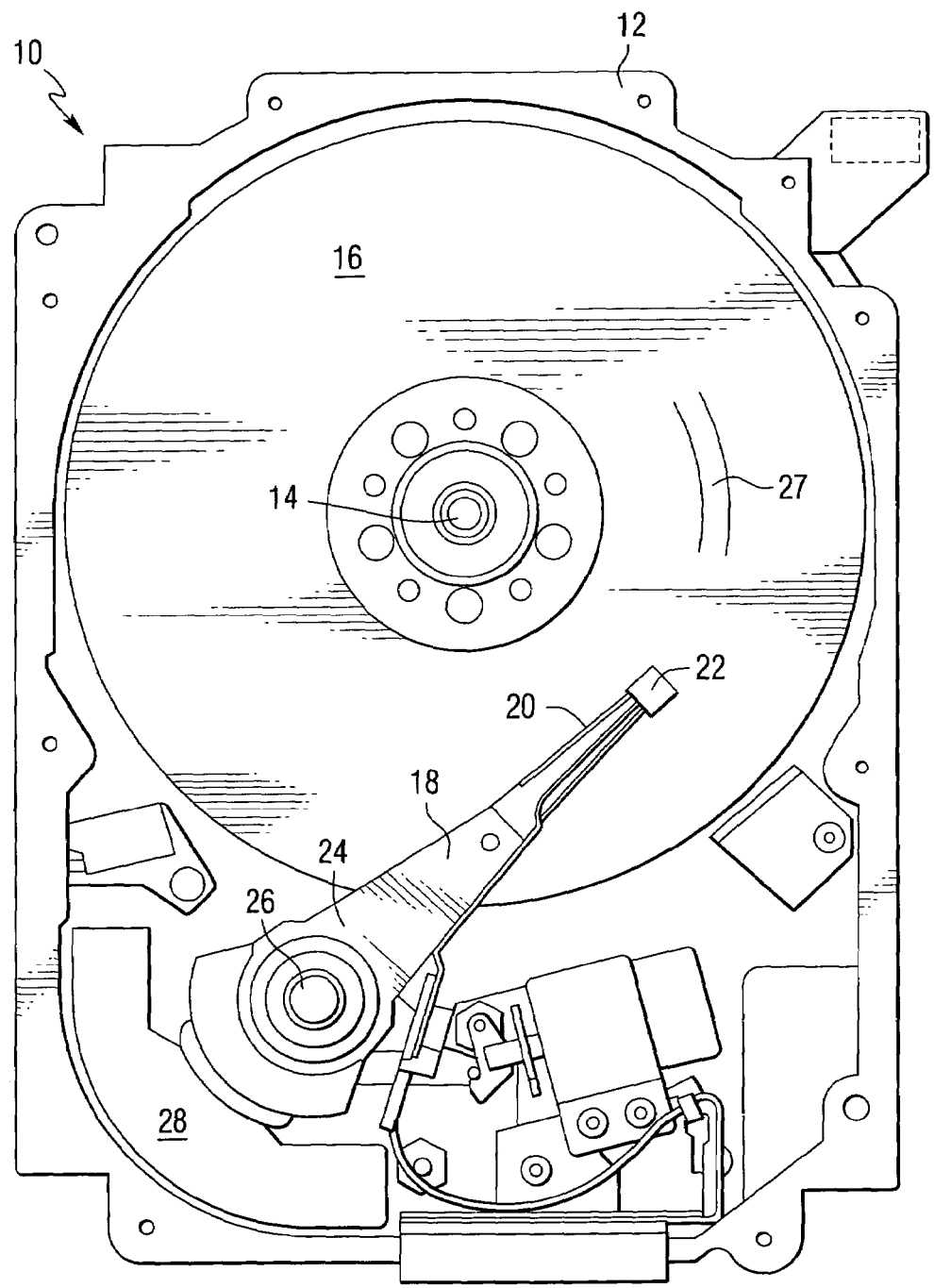
FIG. 1 is a pictorial representation of a disc drive constructed in accordance with this invention.

Referring to the drawings, FIG. 1 is a pictorial representation of a disc drive 10 constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 about a pivot point to position the head 22 over a desired sector of the disc 16. Data is stored in a plurality of concentric tracks 27 on the storage medium. As the disc rotates, the slider flies over the disc surface on a thin air film. Command and control electronics for the disc drive are provided on a printed circuit board (PCB) mounted in the housing. As used in this description the term "head" includes read heads, write heads, and associated structures that can be included in structures commonly referred to as sliders.

Figure 2:
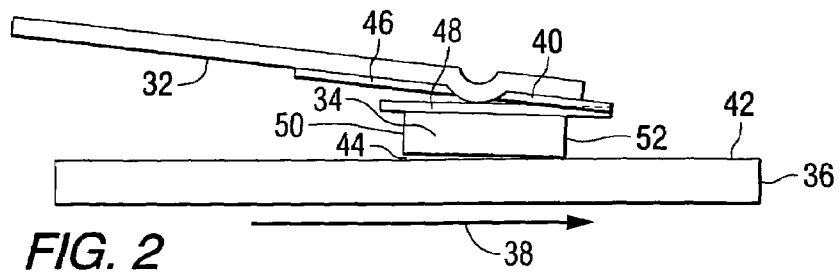
FIG. 2 is a schematic representation of a portion of a suspension arm and a head constructed in accordance with this invention.

FIG. 2 is a schematic representation of a portion of a suspension arm 32 and head 34, in combination with a magnetic recording disc 36. During writing and/or reading of data, the disc moves relative to the head in a direction indicated by arrow 38. The head is coupled to the suspension arm by a gimbal assembly 40, positioned adjacent to a surface 42 of the disc, and separated from the surface of the disc by a thin air film 44. The gimbal assembly includes a first portion 46 connected to the suspension arm 32 and a second portion 48 connected to the head 34. The second portion is cantilevered to the first portion. The head has a leading, or front, end 50 and a trailing, or back, end 52. The leading end faces toward the pivot point of the suspension arm and the trailing end faces away from the pivot point of the suspension arm.

For heat assisted magnetic recording (HAMR), an electromagnetic wave of, for example, visible, infrared or ultraviolet light is directed onto a surface of a data storage medium to raise the temperature of a localized area of the medium to facilitate switching of the magnetization of the area. Recent designs of HAMR recording heads include a thin film waveguide on a head to guide light to the storage medium for localized heating of the storage medium. To launch light into the waveguide, a grating coupler can be used.

Figure 3:
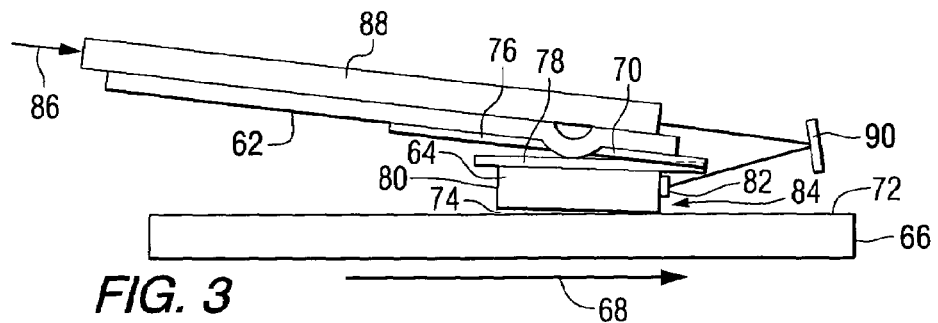
FIG. 3 is a schematic representation of a portion of a suspension arm and another head constructed in accordance with this invention.

FIG. 3 is a schematic representation of a portion of a suspension arm 62 and head 64, in combination with a magnetic recording disc 66. During writing and/or reading of data, the disc moves relative to the head in a direction indicated by arrow 68. The head is coupled to the suspension arm by a gimbal assembly 70, positioned adjacent to a surface 72 of the disc, and separated from the surface of the disc by an air film 74. The gimbal assembly includes a first portion 76 connected to the suspension arm 62 and a second portion 78 connected to the head 64. The second portion is cantilevered to the first portion. The head has a leading, or front, end 80 and a trailing, or back, end 82. The leading end faces toward the pivot point of the suspension arm and the trailing end faces away from the pivot point of the suspension arm. The head includes an optical transducer 84 mounted adjacent to the trailing end. A laser produces a beam of light illustrated by arrow 86 that is transmitted toward the head by an optical fiber 88. A mirror 90 is mounted at the end of the suspension arm to reflect the light toward the optical transducer. In this example, the optical transducer is a planar waveguide mounted in or on the slider. Additional lenses may be necessary to maintain a small beam diameter. While FIG. 3 shows one technique for delivering light to an optical transducer on a head, other light delivery techniques can also be used.

Figures 4, 5:
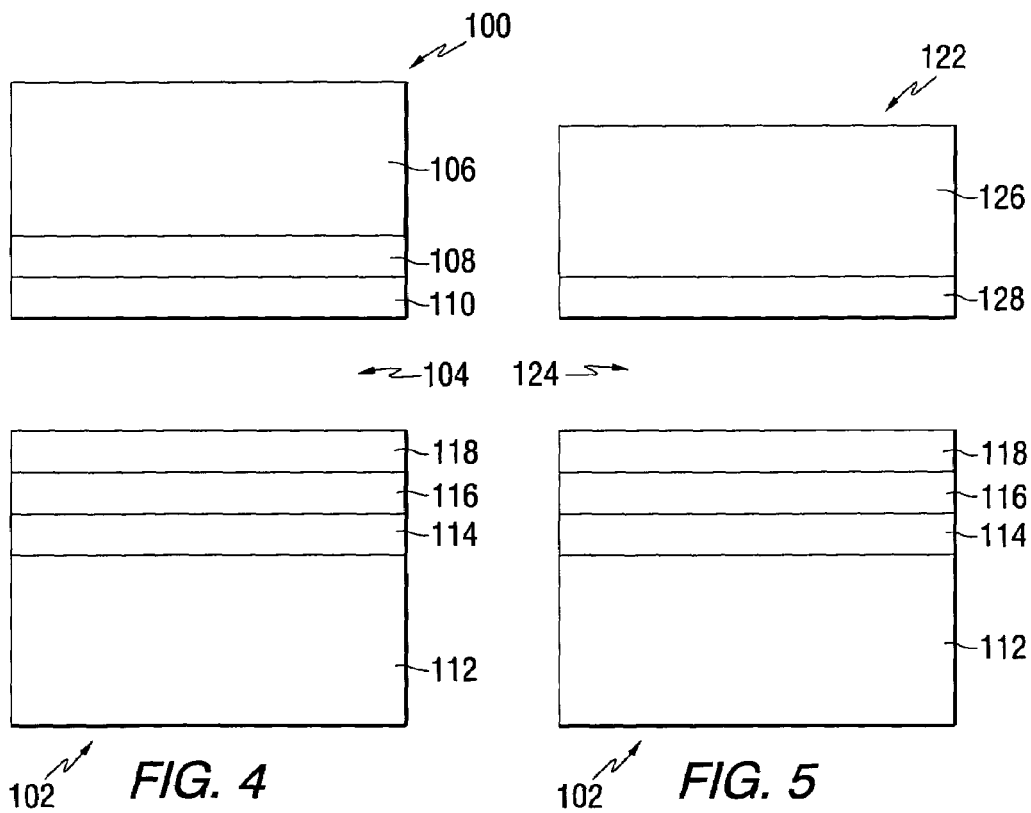
FIG. 4 is a schematic cross-sectional view of a head-disc interface constructed in accordance with this invention.
FIG. 5 is a schematic cross-sectional view of another head-disc interface constructed in accordance with this invention.

This invention provides a head-disc interface (HDI) design that reduces the wear rate for a solid-lubricated media. FIG. 4 is a schematic cross-sectional view of a head-disc interface constructed in accordance with this invention. The head 100 is separated from the recording medium 102 by a thin air film 104. In this example, the head includes a body 106, which may be constructed of, for example, $Al_2O_3$—TiC. An overcoat layer 108, which may be a diamond-like carbon layer, is positioned on the air bearing side of the body. The diamond-like carbon overcoat provides corrosion protection. A protective coating 110, which may be a solid lubricant layer of for example, sputtered PTFE or another fluoride compound, is positioned on the air bearing side of the overcoat layer.

The medium 102 includes a substrate 112, which can be, for example, glass. A recording layer 114 is positioned on the substrate. The recording layer can be, for example, a metallic magnetic layer. An overcoat layer 116 is positioned on the recording layer. The overcoat layer can be, for example, diamond-like carbon, and have a thickness in the range of 1 to 5 nm. A solid lubricant layer 118 is positioned on the overcoat layer and on the air bearing surface of the head. The solid lubricant layer can be for example, sputtered PTFE or another fluoride compound, and can have a thickness in the range of 0.5 to 2 nm.

In FIG. 4, the head is coated with a thin layer of solid lubricant protective coating, which has good lubricating properties and low surface tension, so that the wear rate of the head-media interface is significantly lowered. While FIG. 4 provides an example head and media that include several layers, it should be understood that structures containing additional layers, or fewer layers, are within the scope of this invention.

FIG. 5 is an alternate embodiment of a head-disc interface. In FIG. 5, the head 122 is separated from the recording medium 102 by an air film 124. In this example, the head includes a body 126, which may be constructed of, for example, $Al_2O_3$—TiC. A protective coating 128, which may be a solid lubricant layer of for example, sputtered PTFE or another fluoride compound, is positioned on the air bearing side of the head. The recording medium in FIG. 5 is the same as the recording medium in FIG. 4.

Figure 6:
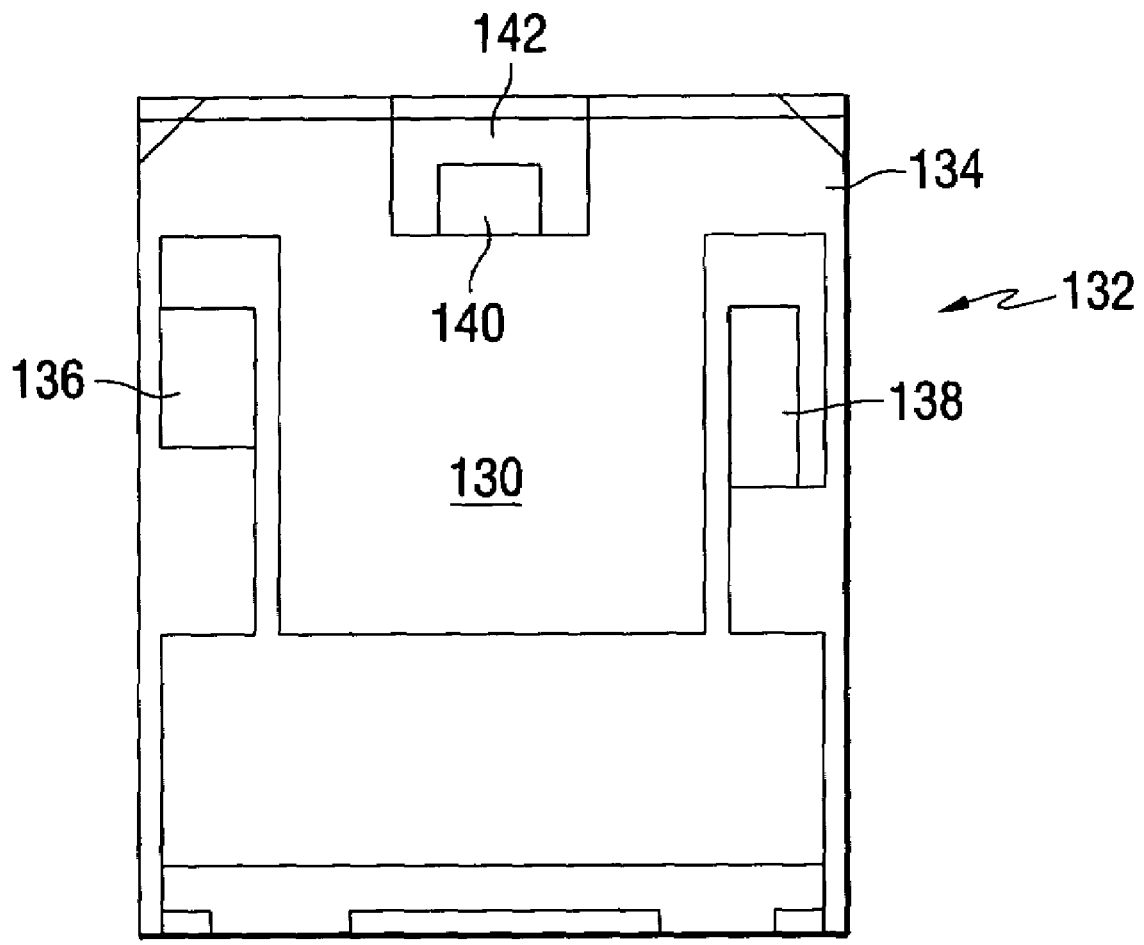
FIG. 6 is a plan view of the air bearing surface of a slider constructed in accordance with this invention.

FIG. 6 is a plan view of the air bearing surface 130 of a slider 132 constructed in accordance with this invention. The air bearing surface includes multiple surfaces, for example 134, 136, 138, 140 and 142 that may lie in different planes. While the protective coating can cover the entire ABS, the invention is not limited to coverage of the entire ABS. In an alternative embodiment, the protective coating can be applied to the portions of the head that have the highest chance of contacting the media. In the example of FIG. 6, portions 142 are most likely to contact the media. However, other portions may also contact the media. FIG. 6 is an example of one of many slider designs.

When this invention is applied to a HAMR head, the protective coating can cover the ABS end of the optical transducer. The protective coating is transparent at the wavelengths of the electromagnetic radiation used for HAMR recording. Solid lubricants used in this invention are suitable for operation over a temperature range of −60° C. to 400° C.

One example of the solid lubricant protective coating on the head is sputtered polytetrafluoroethylene (PTFE). Sputtered PTFE films have low surface energy, evident by a high water contact angle (WCA) value (112 degree). They also have a cross-linked structure that provides good wear resistance. Thickness control of the sputtered PTFE layer on the head is an important consideration. If the coated layer is too thin, it cannot provide the desired protection. However, if the coated layer is too thick, there will be too much head-media spacing (HMS) loss. The desired thickness of the sputtered PTFE layer on the head is between 0.5 to 2 nm.

In a typical process of fabricating thin film magnetic transducers, a large number of transducers are formed simultaneously on a wafer. After the basic structures are formed, the wafer may be sliced into quadrants or rows that are further processed to achieve the desired fine structure. Ultimately, the rows are sliced into individual transducers. In this process, the sputter of PTFE layer can be done immediately after an overcoat, such as a diamond-like coating (DLC), is deposited at $Al_2O_2$—TiC bar level. The PTFE films can be sputtered directly on the surface of a production head.

The sputter process can be implemented as follows. First, heads are mounted on a Si wafer with the head surface facing up. Then the Si wafer is loaded into a sputter machine. A PTFE sheet is bonded to a backing plate to form a PTFE sputter target. The RF power, Ar flow rate, and sputter time are adjusted so that the desired thickness of the coated PTFE layer will be achieved. In one implementation, using a ULVAC MPS-3000-HC3 sputter system, the RF power is set at 75 W, the Ar flow rate is 15 Sccm and the sputter time is 1 minute and 51 seconds. The resulting film thickness in this example is 1 nm.

To evaluate the head-disc interface of this invention, tests were conducted on a structure constructed in accordance with this invention, and on a design having a conventional head and a solid lubricant layer on the media. A 10 K-cycle contact start/stop (CSS) test was conducted with a commercially available head (with a head fly height 8.75 nm) and a sputtered PTFE-coated production media to evaluate the wear of the interface between a solid-lubricated media and a conventional data head. The test was completed without head crash. However, post-test characterization shows that there was severe wear in the CSS zone: wear tracks and accumulated debris were observed, which suggests that the wear rate was high. It was also found that the head was severely contaminated, which also suggests that the wear rate was high. Although the head-media interface has survived the 10 K CSS test, the severe wear might cause corrosion issues for long-term applications.

A 10 K-cycle CSS test was also conducted using the same type of head with a sputtered PTFE-coated air bearing surface in combination with a sputtered PTFE-coated production media. The test was completed successfully without head crash. Post-test characterization shows that the head contamination was significantly reduced. There was no observable damage and much less accumulated debris in the CSS zone, which suggests that the wear rate was reduced significantly.

The protective coating on the head is not limited to the sputtered PTFE. The invention can include any solid lubricant coating with low surface energy and good tribological performance, for example, chemical vapor deposited (CVD) fluorocarbon ($CF_x$) film, having a water contact angle of at least 100 degrees. These films are deposited on a substrate by exposing a precursor gas to either a source of heat or a plasma environment. The resulting reactive species then polymerize on the substrate surface to form the $CF_x$ film. The precursor gas can include $CF_4$, $C_2F_6$, $C_4F_8$, $CF_3H$, $CF_3CF(O)CF_2$ or other organic fluorine compounds. Others have shown that $CF_x$ films have a cross-linked structure (cross-linking density can be controlled by precursors and deposition conditions) and low surface tension as desired in this invention.

While the invention has been described in terms of several examples, it will be apparent to those skilled in the art that various changes can be made to the described examples without departing from the scope of the invention as set forth in the following claims.

What is claimed is:

1. An apparatus comprising:
   a storage medium having a surface coated with a layer of a first solid lubricant; and
   a head separated from the storage medium by an air film, the head having an air bearing surface, wherein at least a portion of the air bearing surface is coated with a layer of a second solid lubricant, wherein each of the layers of first and second solid lubricants has a thickness in the range of 0.5 to 2 nm.

2. The apparatus of claim 1, wherein each of the first and second solid lubricants comprises a fluoride compound.

3. The apparatus of claim 1, wherein at least one of the first and second solid lubricants comprises sputtered polytetrafluoroethylene.

4. The apparatus of claim 1, wherein at least one of the first and second solid lubricants comprises a fluorocarbon compound.

5. The apparatus of claim 1, wherein at least one of the first and second solid lubricants has a water contact angle of at least 100 degrees.

6. An apparatus comprising:
   a storage medium having a surface coated with a layer of a first solid lubricant; and
   a head separated from the storage medium by an air film, the head having an air bearing surface, wherein at least a portion of the air bearing surface is coated with a layer of a second solid lubricant, wherein the head includes:
   a waveguide for transmitting light to the surface of the storage medium.

7. An apparatus comprising:
   a storage medium having a surface coated with a layer of a first solid lubricant; and
   a head separated from the storage medium by an air film, the head having an air bearing surface, wherein at least a portion of the air bearing surface is coated with a layer of a second solid lubricant, wherein the head includes a body and a diamond-like carbon overcoat on the body, and wherein the second solid lubricant is on the diamond-like carbon overcoat.

8. A data storage apparatus comprising:
   a storage medium having a surface coated with a layer of a first solid lubricant;
   a motor for rotating the storage medium;
   a head separated from the storage medium by an air film, the head having an air bearing surface, wherein at least a portion of the air bearing surface is coated with a layer of a second solid lubricant; and
   a suspension arm for positioning the head adjacent to the surface of the storage medium, wherein each of the layers of first and second solid lubricants has a thickness in the range of 0.5 to 2 nm.

9. The apparatus of claim 8, wherein each of the first and second solid lubricants comprises a fluoride compound.

10. The apparatus of claim 8, wherein at least one of the first and second solid lubricants comprises sputtered polytetrafluoroethylene.

11. The apparatus of claim 8, wherein at least one of the first and second solid lubricants comprises a fluorocarbon compound.

12. The apparatus of claim 8, wherein at least one of the first and second solid lubricants has a water contact angle of at least 100 degrees.

13. A data storage apparatus comprising:
   a storage medium having a surface coated with a layer of a first solid lubricant;
   a motor for rotating the storage medium;
   a head separated from the storage medium by an air film, the head having an air bearing surface, wherein at least a portion of the air bearing surface is coated with a layer of a second solid lubricant; and
   a suspension arm for positioning the head adjacent to the surface of the storage medium, wherein the head includes:
   a waveguide for transmitting light to the surface of the storage medium.

14. A data storage apparatus comprising:
   a storage medium having a surface coated with a layer of a first solid lubricant;
   a motor for rotating the storage medium;
   a head separated from the storage medium by an air film, the head having an air bearing surface, wherein at least a portion of the air bearing surface is coated with a layer of a second solid lubricant; and
   a suspension arm for positioning the head adjacent to the surface of the storage medium, wherein the head includes a body and a diamond-like carbon overcoat on the body, and wherein the second solid lubricant is on the diamond-like carbon overcoat.

* * * * *